(12) United States Patent
Motonishi et al.

(10) Patent No.: US 7,724,477 B2
(45) Date of Patent: May 25, 2010

(54) METHOD FOR CORRECTING FLOATING TYPE MAGNETIC HEAD DEVICE

(75) Inventors: Michiharu Motonishi, Niigata-ken (JP); Kazuhiro Takahashi, Niigata-ken (JP); Maho Sakatsume, Niigata-ken (JP); Katsutoshi Usui, Niigata-ken (JP)

(73) Assignee: TDK Corporation, Tokyo (JP)

( * ) Notice: Subject to any disclaimer, the term of this patent is extended or adjusted under 35 U.S.C. 154(b) by 860 days.

(21) Appl. No.: 11/375,233

(22) Filed: Mar. 14, 2006

(65) Prior Publication Data
US 2006/0215325 A1   Sep. 28, 2006

(30) Foreign Application Priority Data
Mar. 25, 2005   (JP)   ............... 2005-088959

(51) Int. Cl.
*G11B 21/21*   (2006.01)
(52) U.S. Cl. .................................................. 360/244.2
(58) Field of Classification Search .................. None
See application file for complete search history.

(56) References Cited
U.S. PATENT DOCUMENTS 7,206,171 B2 *   4/2007   Okawara ................. 360/245.5

2003/0154005 A1 *   8/2003   Wong et al. ................. 700/279
2004/0016733 A1 *   1/2004   Thaveeprungsriporn ................. 219/121.85
2004/0037011 A1 *   2/2004   Inoue et al. ................. 360/313

FOREIGN PATENT DOCUMENTS

| CN | 1336664 A | 2/2002 |
|---|---|---|
| CN | 1373470 A | 10/2002 |
| JP | H01-227279 | 9/1989 |
| JP | 2000-339894 | 12/2000 |

OTHER PUBLICATIONS

The First Office Action issued in corresponding Chinese Patent Application No. 2006100682932; issued on Aug. 24, 2007.

* cited by examiner

*Primary Examiner*—Mark Blouin
(74) *Attorney, Agent, or Firm*—Brinks Hofer Gilson & Lione

(57) ABSTRACT

A correcting method and load beam for reducing variations in floating height of a floating-type magnetic head device is disclosed The correcting method for the floating-type magnetic head device includes the steps of temporarily mounting the floating-type magnetic head device so as to float the head body over a disk equivalent surface; detecting a roll-angle corresponding amount at the end of the load beam in the temporarily mounted state; and correcting the floating-type magnetic head device on the basis of the roll-angle corresponding amount at the end of the load beam by bending the load beam in a direction in that a roll angle at the end approaches zero.

9 Claims, 8 Drawing Sheets

LOAD BEAM

BEFORE

AFTER

HEMISPHERICAL PROJECTION

LEADING

METHOD FOR CORRECTING FLOATING TYPE MAGNETIC HEAD DEVICE

TECHNICAL FIELD

The present application relates to a method for correcting a floating-type magnetic head device mounted in a hard disk device.

BACKGROUND

A floating-type magnetic head device includes a load beam which swings and extends over a rotating hard disk (recording medium), a head body (slider), and a flexure having an elastically flexible tongue piece fixed on a surface of the head body adjacent to the recording medium. When the disk is stopped, the bottom surface of the head body comes in contact with the recording surface of the disk due to an elastic force of the load beam. When the disk is started, air is introduced so as to flow between the head body and the disk surface along the moving direction of the disk, so that the head body floats over the disk surface due to a force associated with the air flow, as applied on the bottom surface of the head body.

For the floating-type magnetic head device, in order to precisely control the horizontal position of the head body and to apply a predetermined load to the magnetic head device, various correcting methods have been proposed. For example, techniques correcting the shape (corresponding amount to a pitch angle or a roll angle) of the flexure so as to correct the position of the head body (Japanese Unexamined Patent Application Publication No. 2000-339894, No. 2001-357644 (U.S. Patent Application Publication No. 2002/008931), and No. 2002-15410) and techniques for deforming the load beam so as to adjust the load (Japanese Unexamined Patent Application Publication No. H01-227279, No. 2002-170351 (U.S. Patent Application Publication No. 2002/060882), No. 2002-260358 (U.S. Patent Application Publication No. 2002/116978), and No. 2004-82161 (U.S. Patent Application Publication No. 2004/037011)) have been proposed.

However, even when the magnetic head device is corrected by such correcting methods, variations in floating height of the head body relative to the disk are generated in a mounted state. The purpose of correcting the floating-type magnetic head device, is to suppress the variations in floating height of the head body (variations for each device and variations in a track width direction of the head body of each device) to a minimum. The load beam itself is assumed to be parallel to the disk without paying attention to the load beam deflection in a mounted state. This is one of the causes of the variations in floating height. It has been difficult to sufficiently correct the device by conventional correcting methods.

SUMMARY

The inventors have discovered that variations in floating height (or in load) can be corrected by bending the load beam in a direction such that the roll angle approaches zero, using the measured deflection. A floating-type magnetic head device is described, including a load beam made of a metallic material and extending over a recording medium; a flexure, having an elastically flexible tongue piece made of a metallic material connected to the load beam adjacent to the recording medium; and a head body fixed on the surface of the tongue piece adjacent to the recording medium. During rotation of the recording medium, the head body floats over the recording medium. The correcting method includes the steps of temporarily mounting the floating-type magnetic head device so as to float the head body over a rotating disk equivalent surface; detecting a roll-angle corresponding amount at the end of the load beam in the temporarily mounted state; and correcting the floating-type magnetic head device on the basis of the roll-angle corresponding amount at the end of the load beam by bending the load beam in a direction and amount such that a roll angle at the end approaches zero.

The roll-angle corresponding amount can be determined by detecting a height difference of the load beam end in the track width direction.

In the correcting step of the method, bending of the load beam may be executed along a line inclined to a direction perpendicular to the longitudinal direction of the load beam. One means of bending the load beam may be by irradiating the load beam with a laser beam. The bending of the load beam may be performed at a position of the load beam adjacent to a swinging fulcrum of the load beam from a connection point between the load beam and the flexure, which is located close to the end extremity.

In order to approximate a zero roll angle at the load beam end, based on the detected roll-angle corresponding amount, it is possible to control the intensity of the laser beam along an inclined line, to control the intensity of the laser beam while the laser beam is applied in the track width direction, or to apply the laser beam over half the distance in the track width direction.

The load beam may be provided with at least one through-hole formed on the line irradiated with the laser beam.

According to the correcting method for a floating-type magnetic head device, in a mounted state of the device on the disk, variations in floating height of the head body can be reduced.

DESCRIPTION

Exemplary embodiments may be better understood with reference to the drawings, but these examples are not intended to be of a limiting nature. Like numbered elements in the same or different drawings perform equivalent functions.

Figure 1:
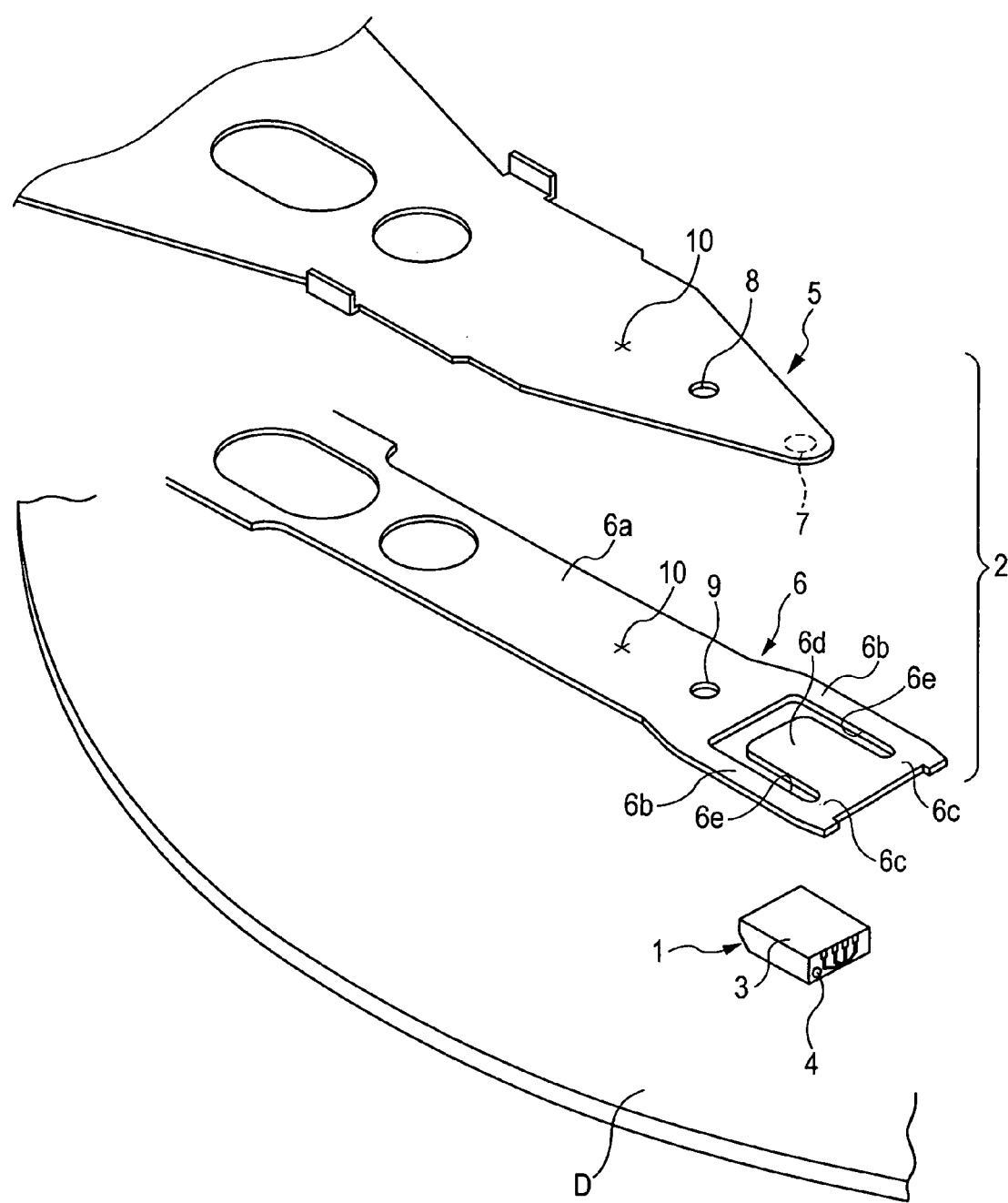
FIG. 1 is an exploded perspective view of an example of a floating-type magnetic head device suitable for performing a correcting method.
Figure 2:
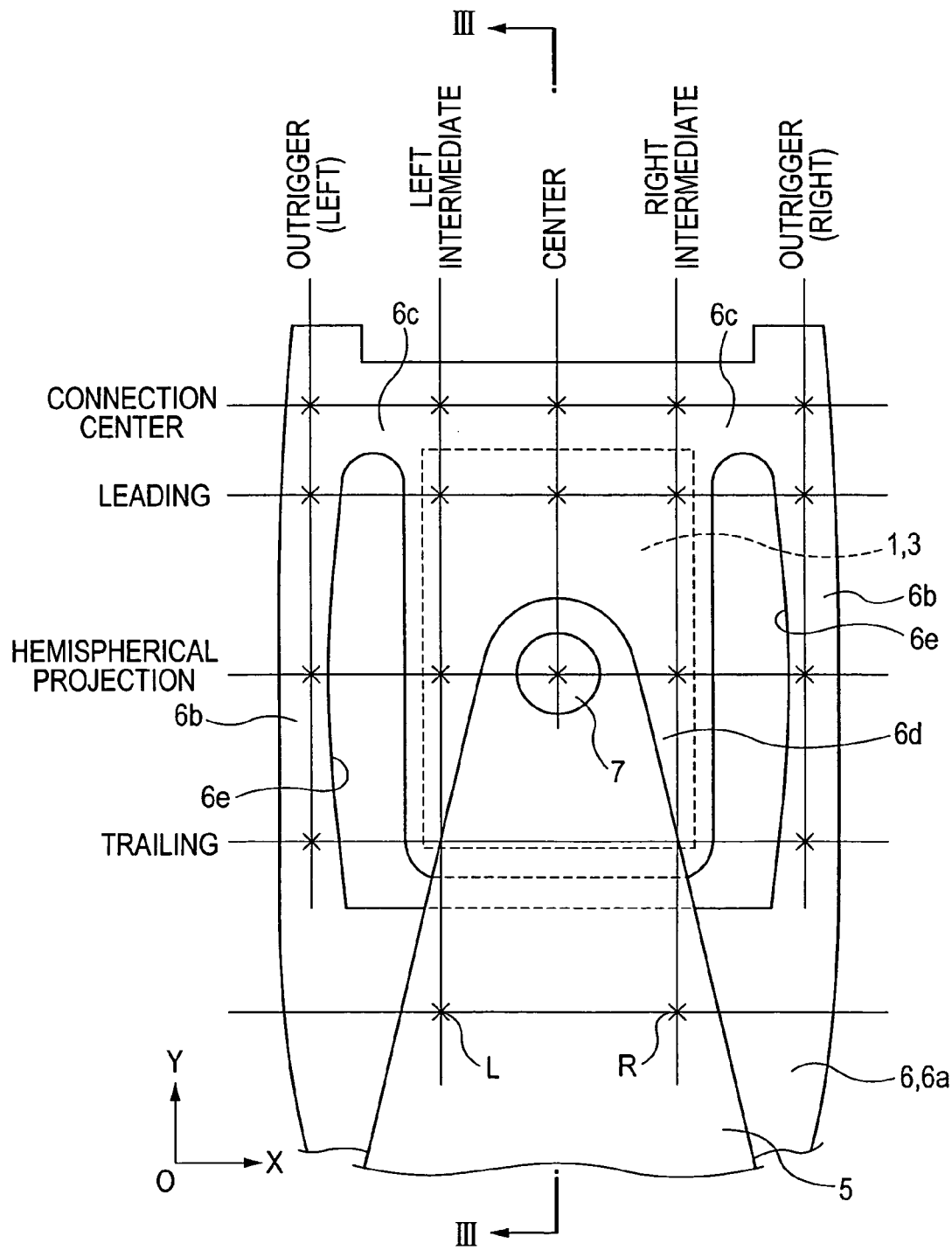
FIG. 2 is an enlarged plan view of a load beam end and a flexure portion.
Figure 3:
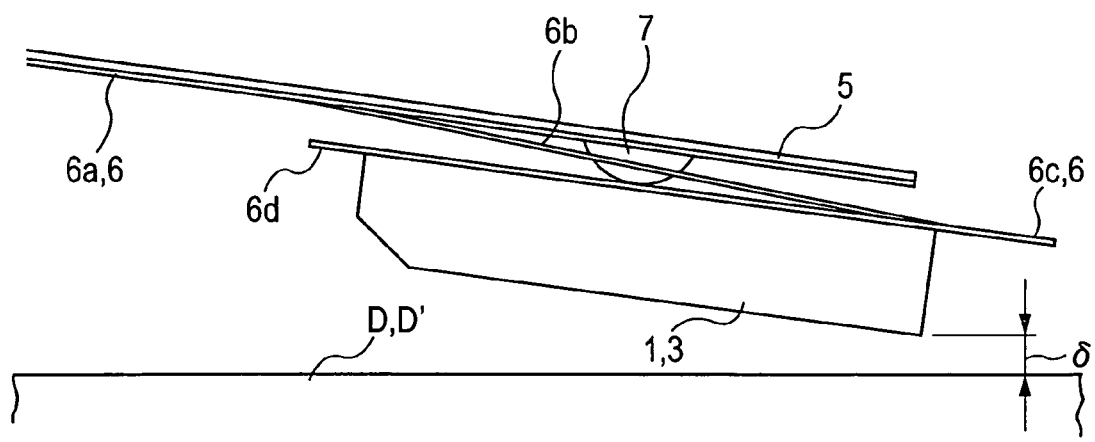
FIG. 3 is a schematic sectional view of a head body in a floated state at the line III-III of FIG. 2.

FIGS. 1 to 3 show an example of a floating-type magnetic head device to be corrected. The floating-type magnetic head device is composed of a head body 1 and a support member 2 for supporting the head body 1. The head body 1 is provided with a slider 3 opposing a recoding disk (recording medium) D, such as a hard disk (FIG. 3), which includes a thin-film element 4 arranged on a trailing end face. The slider 3 is made of a ceramic material. The thin-film element 4 may include an MR head (readout head) for reading out a magnetic signal by detecting a leakage field from the disk D using a magneto resistance effect and an inductive head (writing head) including a coil formed in a pattern.

The support member 2, includes a load beam 5 having a swing fulcrum located outside the circumference of the rotating disk D and disposed so as to be extendable over the disk D, and a flexure 6 connected to the load beam 5. Both the load beam 5 and the flexure 6 are made of a leaf spring material (a metallic material, such as stainless steel). The load beam 5 may be a tapered flat plate having a hemispherical contact portion (hemispherical projection) 7 formed in the vicinity of the end extremity so as to protrude downward toward the disk D.

The flexure 6 includes a fixed part 6a, a lateral pair of outriggers 6b extending forward from the fixed part 6a (toward the free end of the load beam 5), connection parts 6c extending inward from ends of the pair of outriggers 6b, and a tongue piece 6d connected to the connection parts 6c. A U-shaped slit 6e is formed such that the tongue piece 6d is elastically deformable about the connection parts 6c relative to the outriggers 6b. As shown in FIG. 1, the fixed part 6a may be provided with a positioning hole 9 formed therein. After the positioning hole 9 is positioned with a positioning hole 8 formed in the load beam 5, the fixed part 6a is fixed on the bottom surface of the load beam 5 (surface adjacent to the disk D) by a method such as laser welding. One fixed point (mechanical connection part) 10 is shown in FIG. 1; however, a plurality of the fixed points (not shown) are further provided at positions adjacent to the swing fulcrum. The upper surface of the tongue piece 6d is abutted to the hemispherical contact portion 7 such that the head body 1 bonded on the bottom surface of the tongue piece 6d can freely change position using the apex of the hemispherical contact portion 7 as a fulcrum. The load beam 5 has an elastic force in a direction so as to bring the head body 1 in contact with the disk D. On the bottom surfaces (surfaces adjacent to the disk D) of the load beam 5 and the flexure 6, wiring patterns are provided for connecting to the head body 1 (the thin-film element 4); however, they are not shown.

Figure 4:
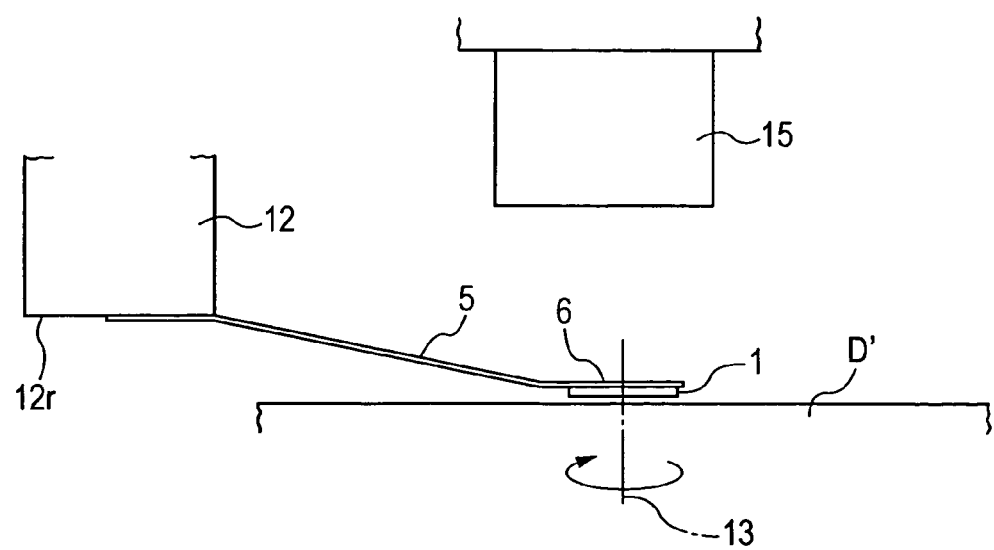
FIG. 4 is a conceptual side view showing a temporarily mounted state of the floating-type magnetic head device shown in FIGS. 1 to 3.

FIG. 4 shows a temporarily mounted state of the magnetic head device described above set on a temporary disk D'. The temporary disk D' is fixed to a temporary-disk driving unit 16 (FIG. 13) rotating about a rotational center 13. The temporary-disk driving unit 16 is connected to a temporary-disk driving circuit 20, and the temporary-disk driving circuit 20 is connected to a control unit 17. The temporary-disk driving circuit 20 feeds a drive signal (electric current) to the temporary-disk driving unit 16 when receiving a driving instruction signal from the control unit 17, so that the temporary-disk driving unit 16 rotates together with the temporary disk D' at a predetermined rotational speed corresponding to the input drive signal. The difference between the mounted state and the temporarily mounted state is that recording/reproducing may not be performed in the temporarily mounted state, but in either mounting state the head body 1 may be put in a floated state by rotating the disk D, or the temporary disk D', respectively. The base of the load beam 5 is abutted on a reference surface 12r of a base plate 12 so as to extend over the temporary disk D'.

When the temporary disk D' is rotated about the rotational center 13, the head body 1 is floated upward as schematically shown in FIG. 3. That is, the head body 1 assumes an inclined floating position over the temporary disk D' such that the leading side is higher than the trailing side. Reference symbol 8 denotes a lift distance. In the floated state, the head body 1 swings about a contact point between the apex of the hemispherical contact portion 7 of the load beam 5 and the tongue piece 6d of the flexure 6, so as to follow the unevenness of the temporary disk D'.

In a temporarily mounted state, a roll-angle corresponding amount at the end of the load beam 5 is determined. The term "end" denotes a position adjacent to the hemispherical contact portion 7 and between the hemispherical contact portion 7 and the fixed point 10 (or the positioning hole 8 (positioning hole 9)). The roll angle is defined to be an inclination of the head 3 from the temporary disk D' in a track width direction, and when the head 3 is parallel with the surface of the temporary disk D', the roll angle is zero (0).

Figure 13:
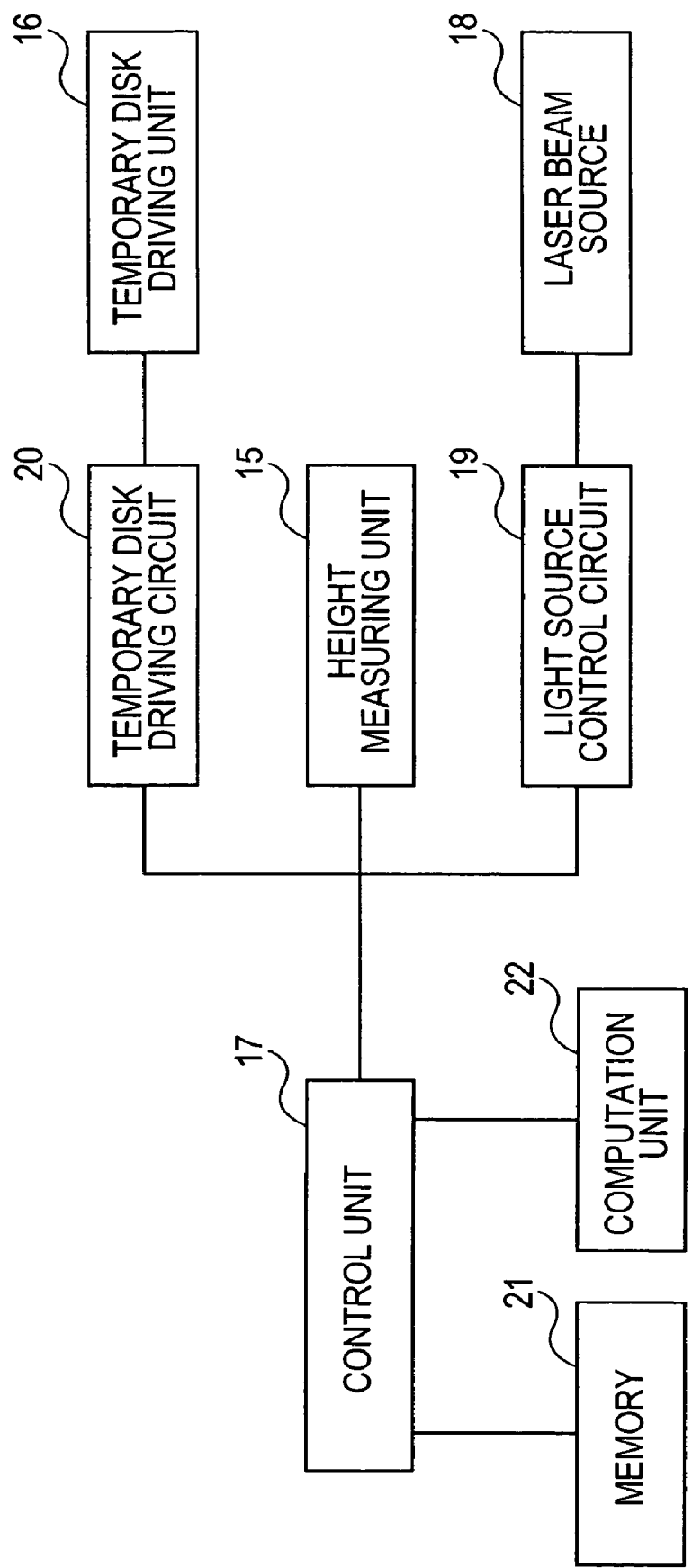
FIG. 13 is a block diagram of a control system of the floating-type magnetic head device incorporating the correcting method.

The reference surface 12r of the base plate 12 is arranged parallel to the surface of the temporary disk D', so that the roll-angle corresponding amount can be detected using a two-point measurement by measuring a height difference to the reference surface 12r at two points spaced from each other in the track width direction. Reference numeral 15 in FIG. 4 denotes a measuring unit which can be freely moved in X and Y directions for measuring a height at an arbitrary position of the surfaces of the load beam 5 and the flexure 6. As shown in FIG. 13, the height measuring unit 15 is connected to the control unit 17 so as to be moveable in the X and Y directions in accordance with the control signal input from the control unit 17. The height measuring instrument 15 may use a laser displacement meter, an interference fringe displacement meter or similar device.

When the temporary-disk driving unit 16 is rotated by receiving a drive signal from the control unit 17, the temporary disk D' fixed to the temporary-disk driving unit 16 rotates so as to float the head body 1 over the temporary disk D'. When the lift distance δ is stabilized, the height measuring instrument 15 moves in X and Y directions in response to an instruction signal from the control unit 17 so as to measure the height between R point (or L point) (FIG. 2) on the surface of the load beam 5 and the surface of the temporary disk D'. The measured value is stored in a memory 21 connected to the control unit 17. After measuring the height at R point (or L point), the height measuring instrument 15 receives an instruction signal from the control unit 17 to measure the height between R point (or L point) and the surface of the temporary disk D'. The measured value is stored in the memory 21. A roll-angle corresponding amount is calculated from the measured values of the heights at R point and L point by a computation unit 22 connected to the control unit 17, and is stored in the memory 21.

Figure 5:
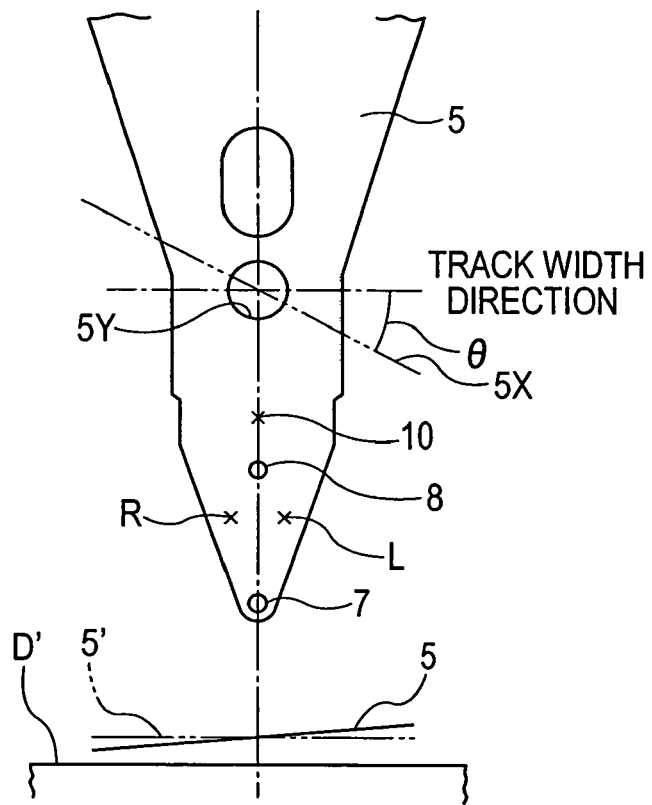
FIG. 5 is a drawing illustrating the correcting method.

A solid line in a lower portion of FIG. 5 represents a measured roll-angle corresponding amount at the end of the load beam 5. The roll-angle corresponding amount is a straight line connecting two points, representing each height with respect to the surface of the temporary disk D' (height differences on the reference basis of the reference surface 12r of the base plate 12) at two points R and L spaced from each other in the track width direction. In this example, the measured roll-angle corresponding value indicates that the height at L point is higher than that at R point at the end of the load beam 5. Reference numeral 5' represents a situation where the roll angle (roll-angle corresponding amount) is zero. The roll angle is substantially estimated by the two-point height difference (roll-angle corresponding amount) measurement as described above.

On the basis of the measured roll-angle corresponding amount, the load beam 5 is bent in a direction such that the roll angle at the end approaches zero. By uniformly bending the load beam 5 along a line inclined by an inclination angle θ to a direction perpendicular to the longitudinal direction of the load beam 5 (track width direction in FIG. 5), the roll angle at the end can approach zero. When the load beam 5 is uniformly bent along an inclined line 5X, shown in an upper portion of FIG. 5, in a direction such that the end is raised, the roll-angle corresponding amount at the end of the load beam 5 is reduced. That is, the line 5X is inclined so that the distance to the end at the R point is larger than that at the L point. Hence, with increasing distance from the inclined line 5X, the lift at the end is increased, so that the roll angle approaches zero. The direction of the inclined line 5X (inclination angle θ) can be determined using the height difference between the points L and R.

Although the bending can be mechanically performed, in for mass production it may be performed by irradiation by laser light. As shown in FIG. 13, a laser beam source 18 for radiating laser light has a light-source control circuit 19 for controlling the intensity and direction of the laser beam light. The light-source control circuit 19 is also connected to the control unit 17. The laser light source 18 may incorporate a semiconductor laser device, for example. When the load beam 5 is irradiated with a laser beam of a specific intensity from the laser beam light source 18 and rapidly cooled (when a laser beam is applied for a short time at atmospheric temperature), the load beam 5 is bent so that the line irradiated with the laser beam becomes a trough. The bending angle (the lift of the end) depends on the intensity of the laser beam.

Accordingly, the direction of the inclined line 5X can be determined on the basis of the detected results of the roll-angle corresponding amount while the intensity of the laser beam can be determined in accordance with the required raised amount (lift) of the end of the load beam 5.

That is, the relationship between the combination of the direction of the inclined line 5X (inclination angle θ) with the intensity of the laser beam and the roll-angle corresponding amount may be set in advance, and on the basis of this relationship, the control unit 17 sets the direction of the inclined line 5X and the intensity of the laser beam so that the roll-angle corresponding amount calculated in the computation unit 22 falls within a predetermined range. When the direction of the inclined line 5X and the intensity of the laser beam are set, the control unit 17 feeds an instruction signal to the light-source control circuit 19 for assigning the circuit to the emitting angle of the laser beam corresponding to the direction of the inclined line 5X and the intensity of the laser beam. The light-source control circuit 19 causes the laser light source 18 irradiate the laser beam in accordance with the instruction signal from the control unit 17.

In such a manner, by setting the direction of the inclined line 5X and the intensity of the laser beam so as to apply the laser beam on the basis of the roll-angle corresponding amount, the load beam 5 can be corrected by the bending. After the correction, the roll-angle corresponding amount of the load beam 5 is measured with the height measuring instrument 15, and then, if the roll-angle corresponding amount is within a predetermined range, the temporary mounting is completed.

The load beam 5 can be generally corrected by bending with one irradiating treatment with the laser beam. However, if the roll-angle corresponding amount is out of a predetermined range, the treatment is repeated by changing irradiation conditions of the laser beam (the direction of the inclined line 5X and the intensity) as necessary.

Also, by controlling the intensity of the laser beam along the inclined line 5X, controlling the irradiation intensity while the laser beam is applied in the track width direction, or by applying the laser beam to half the distance in the track width direction, the bending angle of the end of the load beam 5 can also be changed.

The inclined line 5X (bent line) be set at a position adjacent to the base (the swinging center when being mounted) from the fixed point 10 between the load beam 5 and the flexure 6, which is located close to the end extremity. If the inclined line 5X were set at a position adjacent to the end extremity from the fixed point 10, even when the roll angle at the end of the load beam 5 approaches zero, the effect improving the position of the head body 1 supported by the flexure 6 connected to the load beam 5 via the fixed point 10 is small. Also, it is preferable that a through hole 5Y be formed on the inclined line 5X of the load beam 5 to be irradiated with the laser beam (the inclined line 5X intersects the through hole 5Y). By the existence of the through hole 5Y, the load beam 5 can be easily bent.

Figure 6:
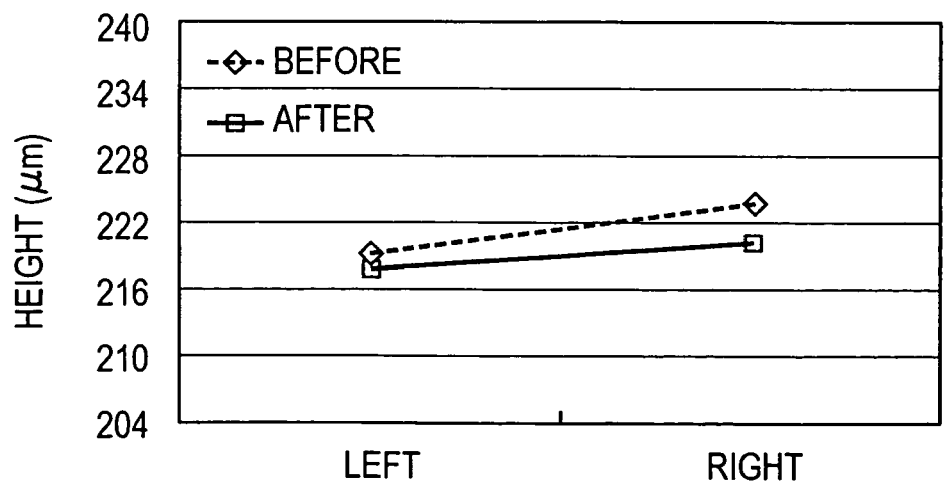
FIG. 6 is a graph showing measured results of the roll angle of the load beam before and after the incorporation of the correcting method.
Figure 7:
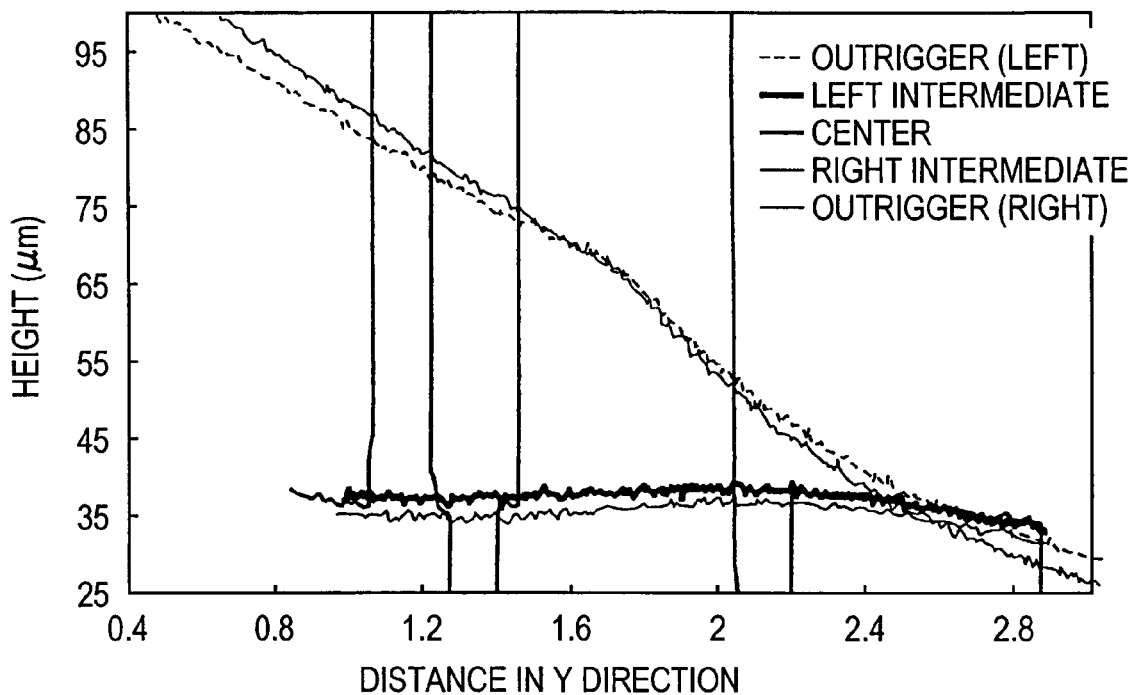
FIG. 7 is a graph showing height distribution of the flexure before the incorporation of the correcting method.
Figure 8:
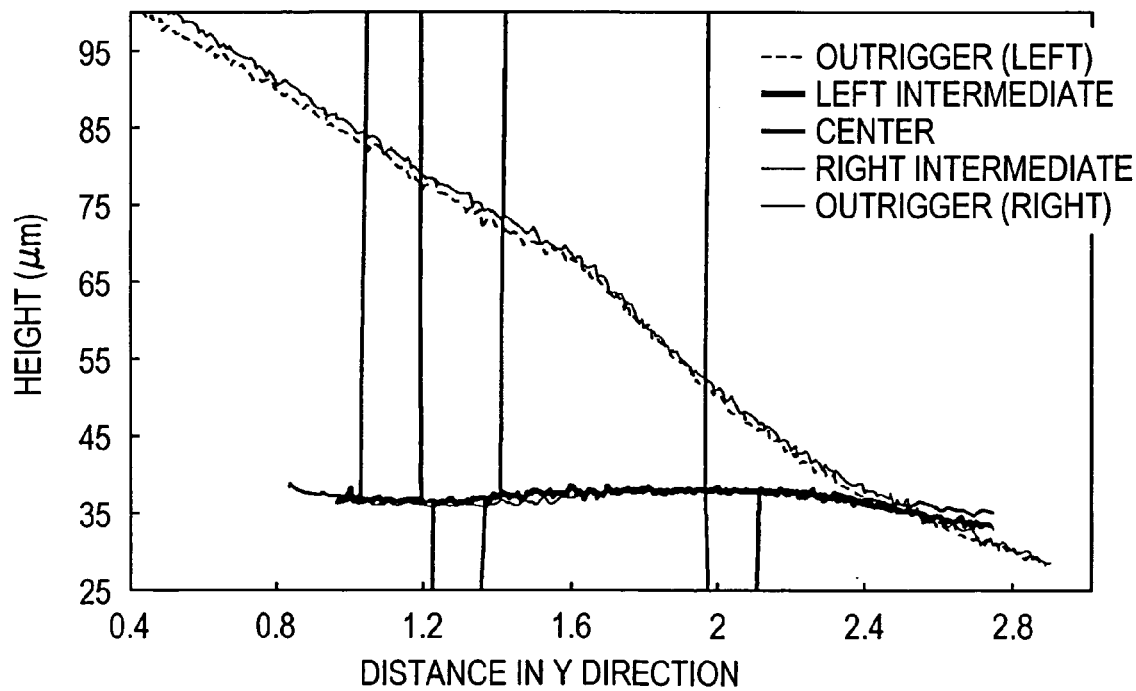
FIG. 8 is a graph showing height distribution of the flexure after the incorporation of the correcting method.
Figure 9:
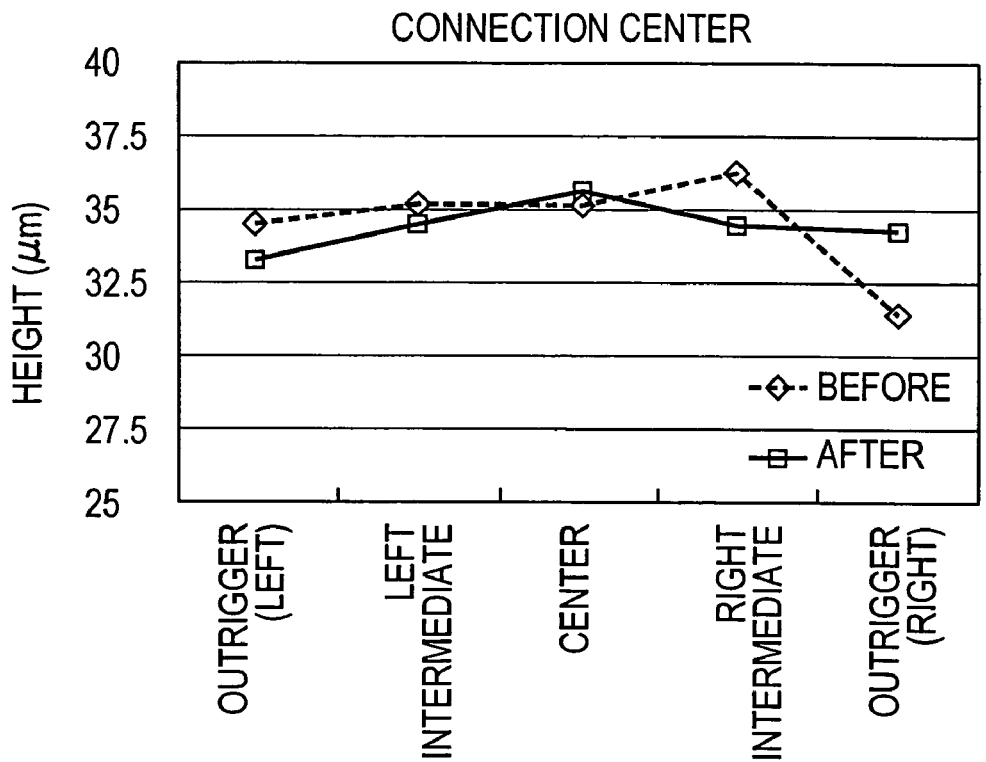
FIG. 9 is a graph showing height distribution of the flexure before and after the incorporation of the correcting method.
Figure 10:
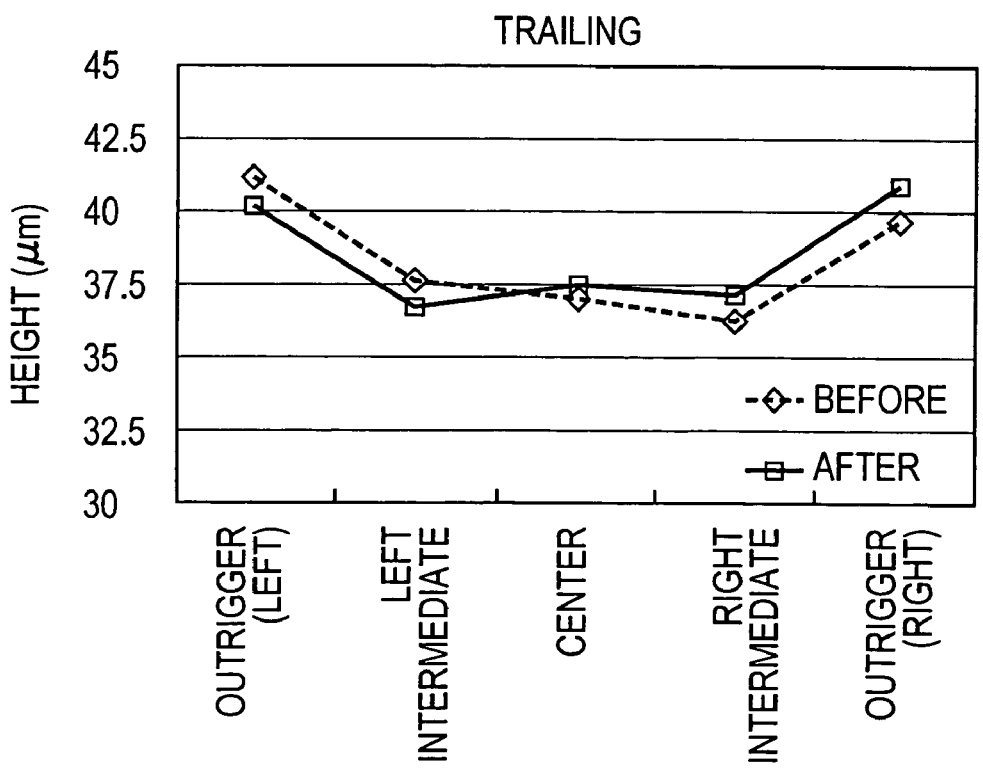
FIG. 10 is a graph showing height distribution of the flexure before and after the incorporation of the correcting method.
Figure 11:
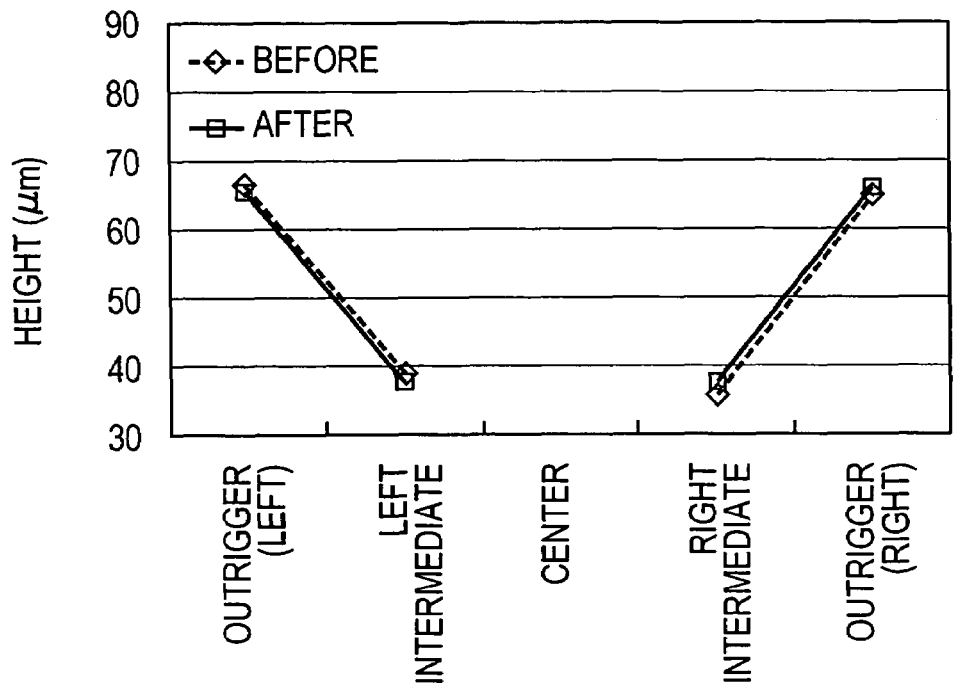
FIG. 11 is a graph showing height distribution of the flexure before and after the incorporation of the correcting method.
Figure 12:
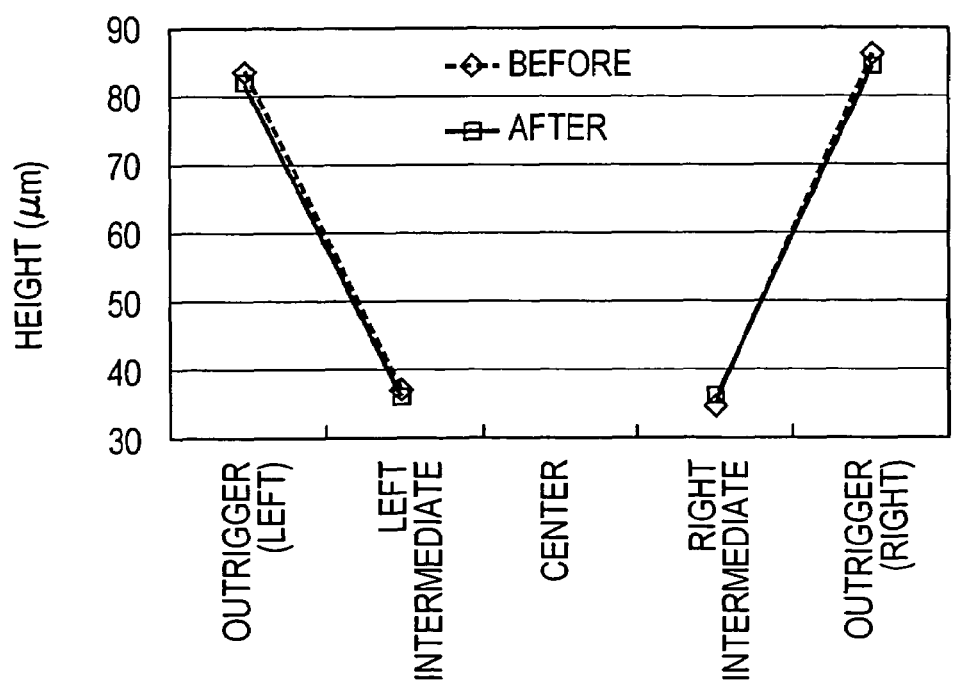
FIG. 12 is a graph showing height distribution of the flexure before and after the incorporation of the correcting method.

The effects of the correcting apparatus and method will be described with reference to an example. The "BEFORE" of FIG. 6 represents measured height results (roll-angle corresponding amounts) at points L and R on the load beam 5 in a temporarily mounted state. At this time (before correction), heights of the flexure 6 at respective points along the coordinates shown in FIG. 2 are shown in FIG. 7. Similarly, the heights of the flexure 6 before correction at respective points along the coordinates shown in FIG. 2 are shown in FIGS. 9 to 12 as "BEFORE". The differences between FIG. 7 and FIGS. 9 to 12 are that while in FIG. 7, heights at respective points along X and Y axes (X-direction: track width direction, Y-direction: direction perpendicular to the X-direction) are shown, in FIGS. 9 to 12, height distributions along the X-direction, the respective heights being located at different positions in the Y-direction (connection center, leading, hemispherical projection, and trailing), are shown. As is understood from FIG. 7, before the correction, the heights at the lateral outriggers 6b are reversed in the extending direction of the load beam 5 and heights of the trailing tongue piece 6d (the slider 3) also vary in the track width direction. From FIGS. 9 to 12, it is apparent that variations along the X-direction are large at any point in the Y-direction.

Based on the detected results of the roll-angle corresponding amount 5 at the end of the load beam 5, the semiconductor laser beam is applied along the inclined line 5X under the following conditions:

load beam material: stainless steel (SUS);
load beam thickness (on the inclined line): 75 μm;
load beam width (track width direction intersecting the center of the through hole 5Y): 2 mm;
load beam length from the center of the through hole 5Y to the end: 4.1 mm;
angle θ of the inclined line 5X from the track width direction: 45°;

intensity of the laser beam: 20 w; and
moving speed: 4000 mm/second.

The "AFTER" in FIG. 6 shows measured results of heights at points L and R of the load beam 5 after the load beam correction is performed by applying the laser beam under the above conditions. The improvement of the roll-angle corresponding amount (approaching zero) is apparent. Also, heights of the flexure 6 at its respective points along the coordinates shown in FIG. 2 after the correction are shown in FIG. 8 and FIGS. 9 to 12 as "AFTER". As is understood from FIG. 8, after the correction, the heights at the lateral outriggers 6b are not reversed. In addition height variations of the trailing tongue piece 6d (the slider 3) in the track width direction are reduced. When the "AFTER" in FIGS. 9 to 12 is compared with the "BEFORE", it is apparent that height variations along the X-direction be improved at any positions in the Y-direction.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. A correcting method for a floating-type magnetic head device for use with a recording medium, the floating-type magnetic head device comprising:
   a load beam made of a metallic material;
   a flexure, having an elastically flexible tongue piece located on the load beam adjacent to the recording medium, made of a metallic material and connected to the load beam; and
   a head body fixed on the surface of the tongue piece, adjacent to the recording medium,
   wherein during rotation of the recording medium, the head body floats over the recording medium, the correcting method comprising:
      temporarily mounting the floating-type magnetic head device with respect to a rotating disk equivalent surface so as to float the head body;
      measuring a roll-angle corresponding amount at the end of the load beam; and
      correcting the floating-type magnetic head device on the basis of the roll-angle corresponding amount at the end of the load beam by bending the load beam in a direction such that a roll angle of the head body with respect to the rotating disk equivalent surface is minimized,
   wherein bending the load beam is performed:
      along a line inclined to a direction perpendicular to the longitudinal direction of the load beam;
      at a position of the load beam closer to a swinging fulcrum of the load beam than to a connection point between the load beam and the flexure; and
      by irradiating on the inclined line on the load beam with a laser beam,
   wherein the roll-angle corresponding amount is estimated by heights of two points spaced from each other in the track width direction of the load beam, and
   wherein the direction of the inclined line and the intensity of the laser beam are determined on the basis of the roll-angle corresponding amount.

2. The method according to claim 1 wherein the roll angle approaches zero.

3. The method according to claim 1, wherein the load beam is provided with at least one through-hole formed on the line.

4. A correcting method for a floating-type magnetic head device for use with a recording medium, the correcting method comprising:
   temporarily mounting a load beam of the floating-type magnetic head device so as to float a head body with respect to a rotating disk surface, where a flexure having an elastically flexible tongue piece is coupled to the load beam;
   measuring a roll-angle corresponding amount between the head body and the rotating disk surface; and
   bending the load beam such that a roll angle of the head body with respect to the rotating disk surface is reduced,
   wherein bending the load beam is performed:
      along a line inclined to a direction perpendicular to the longitudinal direction of the load beam;
      at a position of the load beam closer to a swinging fulcrum of the load beam than to a connection point between the load beam and the flexure; and
      by irradiating on the inclined line on the load beam with a laser beam,
   wherein the roll-angle corresponding amount is estimated by heights of two points spaced from each other in the track width direction of the load beam, and
   wherein the direction of the inclined line and the intensity of the laser beam are determined on the basis of the roll-angle corresponding amount.

5. The method of claim 4 wherein the roll angle approaches zero.

6. The method of claim 4, wherein the roll angle is substantially measured by the roll-angle corresponding amount.

7. The method according to claim 4, wherein the load beam is provided with a through-hole, the line intersecting the through hole.

8. A floating type magnetic head device for use with a rotating recording medium, comprising:
   a load beam having a flexure mounted to one end thereof; and
   a magnetic head affixed to an end of the flexure distal to a load beam attachment and oriented to oppose the rotating magnetic medium;
   wherein the load beam is permanently deformed so as to minimize a roll angle between the magnetic head and the rotating magnetic medium in a floated state,
   wherein the load beam is permanently deformed:
      along a line inclined to a direction perpendicular to the longitudinal direction of the load beam;
      at a position of the load beam closer to a swinging fulcrum of the load beam than to a connection point between the load beam and the flexure; and
      by irradiating on the inclined line on the load beam with a laser beam
   wherein the roll-angle corresponding amount is estimated by heights of two points spaced from each other in the track width direction of the load beam, and
   wherein the direction of the inclined line and the intensity of the laser beam are determined on the basis of the roll-angle corresponding amount.

9. The device of claim 8, wherein the roll angle is substantially zero.

* * * * *